United States Patent
Sayegh

Patent Number: 5,293,330
Date of Patent: Mar. 8, 1994

[54] PIPELINE PROCESSOR FOR MIXED-SIZE FFTS

[75] Inventor: Soheil I. Sayegh, Germantown, Md.

[73] Assignee: Communications Satellite Corporation, Bethesda, Md.

[21] Appl. No.: 789,854

[22] Filed: Nov. 8, 1991

[51] Int. Cl.⁵ .................................. G06F 15/332
[52] U.S. Cl. ..................................... 364/726
[58] Field of Search ......................... 364/725-726

[56] References Cited

U.S. PATENT DOCUMENTS

| | | | |
|---|---|---|---|
| H570 | 1/1989 | Tylaska et al. | 369/715.01 |
| 4,689,762 | 8/1987 | Thibodeau, Jr. | 364/726 |
| 4,769,779 | 9/1988 | Chang et al. | 364/726 X |
| 4,912,668 | 3/1990 | Aubie et al. | 364/725 |
| 5,029,079 | 7/1991 | Magar et al. | 364/726 X |
| 5,053,985 | 10/1991 | Friedlander et al. | 364/725 |
| 5,093,801 | 3/1992 | White et al. | 364/726 |

*Primary Examiner*—Tan V. Mai
*Attorney, Agent, or Firm*—Sughrue, Mion, Zinn, Macpeak & Seas

[57] ABSTRACT

A method is described for performing fast Fourier transforms (FFTs) of various sizes simultaneously in one pipeline processor. The processor consists of several stages of butterfly computational elements alternated with delay-switch-delay (DSD) modules that reorder the data between the butterfly stages. The sequence of the DSD operations in the pipeline is made arbitrary. This flexibility in choosing the DSD sequence enhances the fault tolerance operation of the pipeline in case of a partial failure in one or more of the DSD modules. If one of the DSDs is no longer capable of operating in its prescribed mode, it is assigned a different operating mode. All the required changes are performed by software control without the need to physically remove or interchange any components. By properly ordering the input data to the pipeline and the butterfly twiddle factors, and by bypassing some butterfly elements for the smaller size transforms, it is shown that any mixture of FFT sizes can be performed. FFTs of radix 2, radix 4, and mixed 2 and 4 are considered. In each case, the principles of operation are explained and examples of timing diagrams are given.

15 Claims, 12 Drawing Sheets

FIG. 2

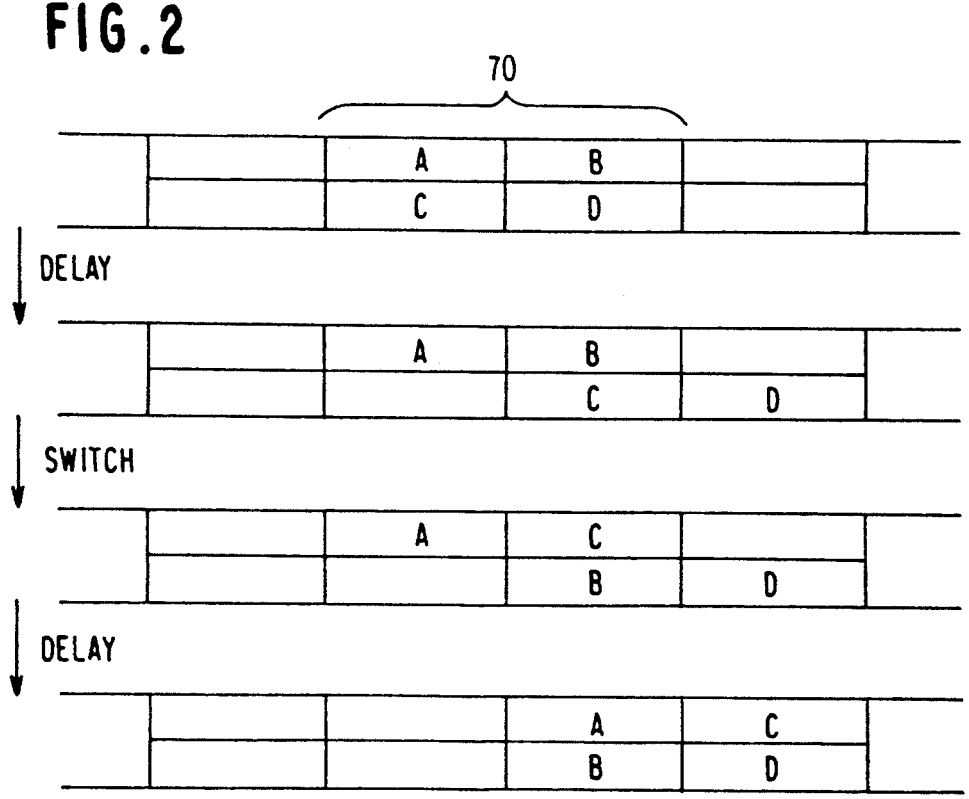

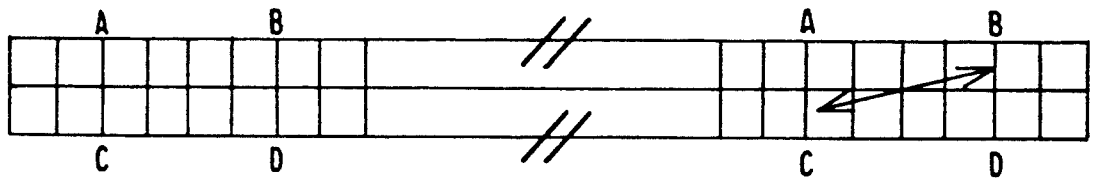

- SUBBLOCKS A, B, C, AND D EACH CONTAIN $k$ CELLS.
- SAMPLES IN A AND D REMAIN IN THEIR CELLS.
- A SAMPLE IN A CELL $i$ IN B MOVES TO CELL $j$ IN C WHERE $j = i + N/2 - k$, AND SIMILARLY THE SAMPLE IN CELL $j$ IN C MOVES TO CELL $i$ IN B.
- A CELL $i$ IN A OR B HAS $i_0 = 0$ (TOP ROW), AND A CELL $i$ IN C OR D HAS $i_0 = 1$ (BOTTOM ROW).
- A CELL $i$ IN A OR C HAS $i_{M-p-1} = 0$ ($\lfloor i/k \rfloor$ IS EVEN), AND A CELL $i$ IN B OR D HAS $i_{M-p-1} = 1$ ($\lfloor i/k \rfloor$ IS ODD).

FIG.3

| $i_0$ | $i_1$ | $i_2$ | $i_3$ | $i_4$ | 75 | 70 → $i_4=1$ | 71 → $i_4=0$ $i_1=1$ | 72 → $i_4=0$ $i_1=0$ $i_2=0$ | 73 → $i_4=0$ $i_1=0$ $i_2=1$ $i_0=0$ | 74 → $i_4=0$ $i_1=0$ $i_2=1$ $i_0=1$ |
|---|---|---|---|---|---|---|---|---|---|---|
| 0 | 0 | 0 | 0 | 0 | 0 |   |   | 0 |   |   |
| 0 | 0 | 0 | 0 | 1 | 1 | 0 |   |   |   |   |
| 0 | 0 | 0 | 1 | 0 | 2 |   |   | 1 |   |   |
| 0 | 0 | 0 | 1 | 1 | 3 | 1 |   |   |   |   |
| 0 | 0 | 1 | 0 | 0 | 4 |   |   |   | 0 |   |
| 0 | 0 | 1 | 0 | 1 | 5 | 2 |   |   |   |   |
| 0 | 0 | 1 | 1 | 0 | 6 |   |   |   | 1 |   |
| 0 | 0 | 1 | 1 | 1 | 7 | 3 |   |   |   |   |
| 0 | 1 | 0 | 0 | 0 | 8 |   | 0 |   |   |   |
| 0 | 1 | 0 | 0 | 1 | 9 | 4 |   |   |   |   |
| 0 | 1 | 0 | 1 | 0 | 10 |   | 1 |   |   |   |
| 0 | 1 | 0 | 1 | 1 | 11 | 5 |   |   |   |   |
| 0 | 1 | 1 | 0 | 0 | 12 |   | 2 |   |   |   |
| 0 | 1 | 1 | 0 | 1 | 13 | 6 |   |   |   |   |
| 0 | 1 | 1 | 1 | 0 | 14 |   | 3 |   |   |   |
| 0 | 1 | 1 | 1 | 1 | 15 | 7 |   |   |   |   |
| 1 | 0 | 0 | 0 | 0 | 16 |   |   | 2 |   |   |
| 1 | 0 | 0 | 0 | 1 | 17 | 8 |   |   |   |   |
| 1 | 0 | 0 | 1 | 0 | 18 |   |   | 3 |   |   |
| 1 | 0 | 0 | 1 | 1 | 19 | 9 |   |   |   |   |
| 1 | 0 | 1 | 0 | 0 | 20 |   |   |   |   | 0 |
| 1 | 0 | 1 | 0 | 1 | 21 | 10 |   |   |   |   |
| 1 | 0 | 1 | 1 | 0 | 22 |   |   |   |   | 1 |
| 1 | 0 | 1 | 1 | 1 | 23 | 11 |   |   |   |   |
| 1 | 1 | 0 | 0 | 0 | 24 |   | 4 |   |   |   |
| 1 | 1 | 0 | 0 | 1 | 25 | 12 |   |   |   |   |
| 1 | 1 | 0 | 1 | 0 | 26 |   | 5 |   |   |   |
| 1 | 1 | 0 | 1 | 1 | 27 | 13 |   |   |   |   |
| 1 | 1 | 1 | 0 | 0 | 28 |   | 6 |   |   |   |
| 1 | 1 | 1 | 0 | 1 | 29 | 14 |   |   |   |   |
| 1 | 1 | 1 | 1 | 0 | 30 |   | 7 |   |   |   |
| 1 | 1 | 1 | 1 | 1 | 31 | 15 |   |   |   |   |

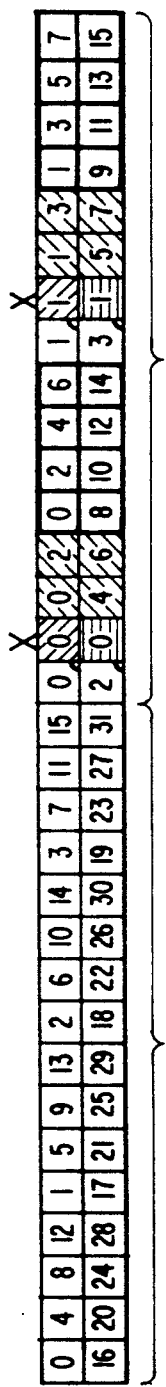
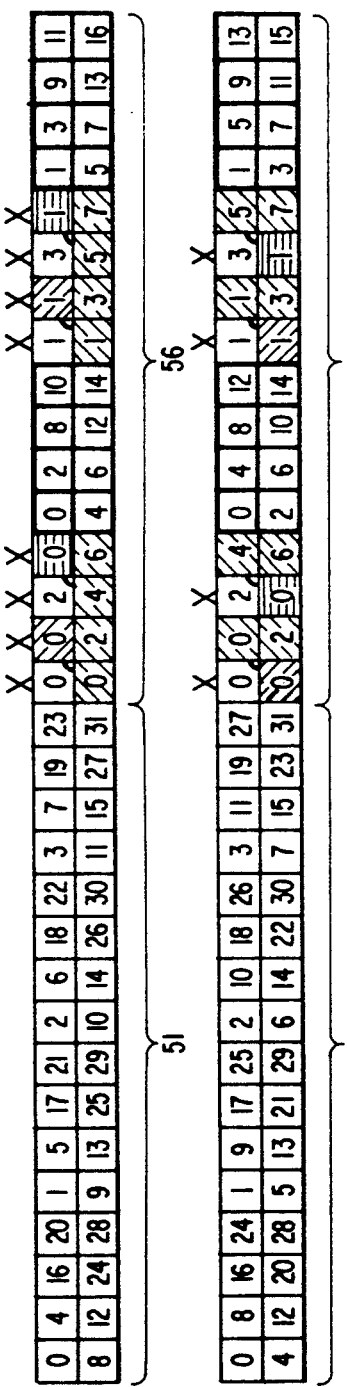
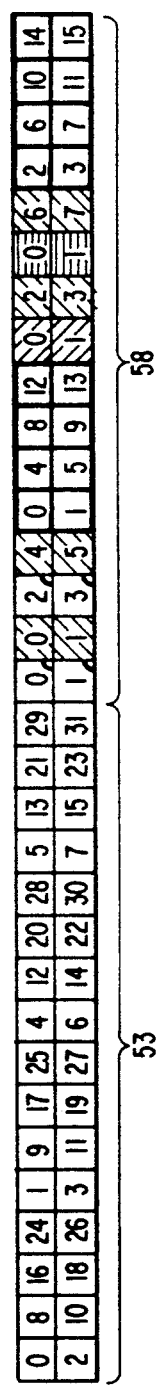
FIG. 4a
FIG. 4b
FIG. 4c
FIG. 4d
FIG. 4e

FIG. 6a, FIG. 6b, FIG. 6c

KEY:
- ☐ 64-POINT TRANSFORM
- ▧ 16-POINT TRANSFORMS
- ☐ 4-POINT TRANSFORMS
- X BYPASSING BUTTERFLY

FIG.11a

| A | B | C | D | E | F | G | H | I | J | K | L | M | N | O | P |
|---|---|---|---|---|---|---|---|---|---|---|---|---|---|---|---|
| XXXXX | XXXXX | S | T | U | V | W | X | Y | Z | AA | BB | CC | DD | EE | FF |
| XXXXX | XXXXX | S | T | U | V | W | X | Y | Z | AA | BB | CC | DD | EE | FF |

FIG.11b

| A | B | C | D | E | F | G | H | I | J | K | L | M | N | O | P |
|---|---|---|---|---|---|---|---|---|---|---|---|---|---|---|---|
| 0XXXX | 0XXXX | 0 | 0 | 0 | 0 | 0 | 0 | 0 | 0 | 0 | 0 | 0 | 0 | 0 | 0 |
| 1XXXX | 1XXXX | S | T | U | V | W | X | Y | Z | AA | BB | CC | DD | EE | FF |
|   |   | 1 | 1 | 1 | 1 | 1 | 1 | 1 | 1 | 1 | 1 | 1 | 1 | 1 | 1 |

FIG.11c

| A | B | Q | R | E | F | G | H | I | J | K | L | M | N | O | P |
|---|---|---|---|---|---|---|---|---|---|---|---|---|---|---|---|
| 00 | 00 | 10 | 10 | 00 | 01 | 10 | 0 | 00 | 00 | 0 | 10 | 00 | 0 | 10 | DD |
|   |   |   |   |   |   |   | X |   |   | Y | Z |   | P |   |   |
|   |   | S | T | G | H | W | 1 | X | Z | 1 | 1 | 1 | 1 | 1 | FF |
|   |   | 11 | 11 | 01 | 01 | 11 |   | 01 | 01 |   |   |   |   |   | 11 |

FIG.11d

| A | B | C | D | E | F | G | H | I | J | K | L | M | N | O | P |
|---|---|---|---|---|---|---|---|---|---|---|---|---|---|---|---|
| 000 | 000 | 100 | 110 | 000 | 010 | 100 | 110 | 000 | 010 | 100 | 110 | 000 | 010 | 100 | 110 |
| B | F | R | T | F | H | U | X | J | L | Y | AA | N | P | CC | EE |
| 001 | 001 | 101 | 111 | 001 | 011 | 101 | 111 | 001 | 011 | 101 | 111 | 001 | 011 | 101 | 111 |

FIG.11e

| A | B | C | D | E | F | G | H | I | J | K | L | M | N | O | P |
|---|---|---|---|---|---|---|---|---|---|---|---|---|---|---|---|
| 0000 | 0010 | 1000 | 1100 | 0000 | 0100 | 1000 | 1100 | 0010 | 0110 | 1010 | 1110 | 0010 | 0110 | 1010 | 1110 |
| I | J | Y | AA | M | O | CC | EE | B | L | Z | BB | N | P | DD | FF |
| 0001 | 0011 | 1001 | 1101 | 0001 | 0101 | 1001 | 1101 | 0011 | 0111 | 1011 | 1111 | 0011 | 0111 | 1011 | 1111 |

FIG.11f

| A | C | S | W | I | K | Y | AA | B | D | R | T | J | L | Z | BB |
|---|---|---|---|---|---|---|---|---|---|---|---|---|---|---|---|
| 00000 | 00100 | 11000 | 11100 | 00010 | 01010 | 10010 | 11010 | 00100 | 01100 | 10100 | 11100 | 00110 | 01110 | 10110 | 11110 |
| E | G | U | X | M | O | CC | EE | F | H | V | X | N | P | DD | FF |
| 00001 | 01001 | 10001 | 11001 | 00011 | 01011 | 10011 | 11011 | 00101 | 01101 | 10101 | 11101 | 00111 | 01111 | 10111 | 11111 |

FIG.12a

| 0 | 4 | 8 | 12 | 1 | 5 | 9 | 13 | 2 | 6 | 10 | 14 | 3 | 7 | 11 | 15 |
| --- | --- | --- | --- | --- | --- | --- | --- | --- | --- | --- | --- | --- | --- | --- | --- |
| 16 | 20 | 24 | 28 | 17 | 21 | 25 | 29 | 18 | 22 | 26 | 30 | 19 | 23 | 27 | 31 |

FIG.12b

| | | | | 0 | 2 | 4 | 6 | | | | | 1 | 3 | 5 | 7 |
| --- | --- | --- | --- | --- | --- | --- | --- | --- | --- | --- | --- | --- | --- | --- | --- |
| | | | | 8 | 10 | 12 | 14 | | | | | 9 | 11 | 13 | 15 |

FIG.12c

| | | 0 | 2 | | | | | | | 1 | 3 | | | | |
| --- | --- | --- | --- | --- | --- | --- | --- | --- | --- | --- | --- | --- | --- | --- | --- |
| | | 4 | 6 | | | | | | | 5 | 30 | | | | |

FIG.12d

| 0 | | | | | | | | 1 | | | | | | | |
| --- | --- | --- | --- | --- | --- | --- | --- | --- | --- | --- | --- | --- | --- | --- | --- |
| 2 | | | | | | | | 3 | | | | | | | |

FIG.12e

| 0 | | | | | | | | 1 | | | | | | | |
| --- | --- | --- | --- | --- | --- | --- | --- | --- | --- | --- | --- | --- | --- | --- | --- |
| 0 | | | | | | | | 1 | | | | | | | |

PIPELINE PROCESSOR FOR MIXED-SIZE FFTS

FIELD OF THE INVENTION

The present invention relates to a method and apparatus for performing multiple sized fast Fourier transforms (FFTs) and inverse fast Fourier transforms (IFFTs) in a single pipeline structure.

BACKGROUND OF THE INVENTION

The discrete Fourier transform (DFT) plays a key role in digital signal processing in areas such as spectral analysis, frequency-domain filtering, and polyphase transformations. Several efficient algorithms for computing the DFT have been proposed over the years. Indeed, the existence of such fast algorithms has made the DFT the workhorse of digital signal processing.

For each algorithm, one of several architectures may be chosen, depending on the given requirements (e.g., speed, cost, and power). For real-time, very high-speed signal processing, a dedicated special-purpose hardware processor is often required. An efficient pipeline architecture that implements the Cooley-Tukey fast Fourier transform (FFT) algorithm has been proposed and has received considerable attention. Interest is particularly great for spaceborne applications, such as satellite communications, where efficient implementations are of paramount importance because of power and size constraints.

The need for performing various size FFTs arises when digitally demultiplexing a number of frequency-multiplexed carriers that occupy bandwidths of various sizes, using a frequency-domain approach. An FFT is first performed on the digital samples of the composite signal. This is followed by multiplication of the resulting frequency coefficients across the overall spectrum by any desired filter functions to separate the various carriers and introduce spectral shaping, if desired. IFFTs are then performed on the individual carriers to recover the time domain waveforms. To minimize the amount of computation involved, the IFFT performed on a given carrier should only cover the frequency band occupied by that carrier. Thus, different carrier bandwidths will result in different IFFT sizes.

Multiple FFT sizes are also needed for multiple resolution spectral analysis and polyphase transformations on carriers of unequal size.

An old method of performing FFTs of various sizes dedicated a different processor to each size of FFT to be performed. Pipeline processors are often used when real time, high speed processing is desired. Therefore, in order to perform the different-size FFTs, several FFT pipelines were needed. The number of stages in each pipeline would be determined by the size of the FFT to be performed by the particular pipeline.

For each FFT pipeline, the sequence of the delays in the pipeline was strictly increasing or strictly decreasing.

However, the old pipeline method required a large amount of hardware to perform all the desired transforms which was disadvantageous. For example, if 3 different FFT sizes were required, 3 pipelines, each with a number of stages matched to one of the desired FFTs would be required.

Another disadvantage of the old method is that a failure in one of the delay elements could cause the entire pipeline processor to fail and consequently, the system was unable to perform more transforms having that particular size (assuming there was only one pipeline for each size transform).

OBJECT OF THE INVENTION

Accordingly, it is an object of the present invention to provide a pipeline architecture, which can efficiently perform FFTs or inverse FFTs (IFFTs) of various sizes simultaneously in the same pipeline.

It is a further object of this invention to perform the various size FFTs and IFFTs regardless of the sequence of commutators/butterflies in the pipeline.

It is also an object of this invention to enhance the pipeline's fault tolerance by allowing reconfiguration of the sequence of commutators/butterflies under software control.

SUMMARY AND ADVANTAGES OF THE INVENTION

The method of the invention offers two primary advantages over the old method. First, it allows a single pipeline processor to perform several FFTs, each of which has a different size. The pipeline is modified to perform transforms of various sizes simultaneously. These modifications are performed dynamically (using a few control signals) to allow the pipeline to constantly alter its function in real time to accommodate the various transformation sizes required. By properly ordering the input data to the pipeline and bypassing some arithmetic modules for the smaller size transforms, any mixture of sizes of FFTs (IFFTs) can be performed without requiring changes to the simple and regular action of the DSD (i.e. the delay-switch-delay modules).

The second advantage of the invention over the old method is that it provides some fault tolerance in case of damage to some of the memory cells in the delay lines of the pipeline's DSDs. Although the various DSDs need different amounts of delay, a single chip design with a delay line providing the longest delay needed is typically used, with smaller delays obtained by simply selecting among a set of taps on that delay line. If one of the memory cells in the delay line is damaged, the chip can still provide a valid DSD function, albeit with a smaller delay, by selecting a tap which precedes the damaged segment. By reordering the input data and reconfiguring the DSD function of the other stages, correct FFT operation may still be accomplished. All the required changes can be performed under software control, without physically removing, adding or interchanging any components. Other approaches to enhancing fault tolerance of an FFT pipeline that require the incorporation of one or more spare modules can also be used, thus resulting in even greater reliability.

The invention is a method and apparatus for performing fast Fourier transforms (FFTs) or IFFTs of various sizes simultaneously in one pipeline processor. The processor consists of several stages of butterfly computational elements alternated with delay-switch-delay (DSD) modules that reorder the data between the butterfly stages. The sequence of the DSD operations in the pipeline can be arbitrary. This flexibility in assigning the DSD sequence enhances the fault tolerance operation of the pipeline in case of a partial failure in one or more of the DSD modules. If one of the DSDs is no longer capable of operating in its prescribed mode, it is assigned a different operating mode. All the required changes are performed by software control without the need to physically remove or interchange any components. By properly ordering the input data to the pipeline and the butterfly twiddle factors, and by bypassing some butterfly elements for the smaller size transforms, any mixture of FFT sizes can be performed. While, embodiments for FFTs of radix 2, radix 4, and mixed 2 and 4 pipelines are set forth, the scope of the present invention is not limited to these pipeline sizes.

BRIEF DESCRIPTION OF THE DRAWINGS

FIG. 3 represents the mapping indices of a 32-Point transform into indices of various smaller transforms.

FIGS. 4a–4e represent a timing diagram for the mixed-size radix 2 Fast Fourier Transform.

FIGS. 6a–6c represent a timing diagram for the Mixed-Size Radix 4 Fast Fourier Transform.

FIGS. 11a–11f illustrates timing diagrams generated while performing the present method of FIG. 9.

FIGS. 12a–12e represent an exemplary operation for mapping the smaller transforms into a larger transform based on the mapping diagram of FIG. 3.

THEORETICAL EXPLANATION OF THE PRESENT INVENTION

The theory upon which the present invention is based is first set forth with reference to a Radix 2 pipeline merely as an example. The following notation will be used throughout; N denotes the size of the FFT and $M = \log_2 N$ (for a Radix 2 pipeline) denotes the number of stages of FFT processing. As is well known, when performing an FFT of size N in a Radix 2 pipeline, the first stage of processing combines pairs of samples whose indices are N/2 apart (samples are indexed from 0 to N−1). The second stage combines pairs whose indices are N/4 apart, and so on.

In the following discussion, the sample index will be referring to the sample itself (e.g. the index will identify the position of the sample, such as 0–32, within the input data stream). Thus, for instance, for the first stage of processing, 0 and N/2 will denote the first sample pair input to and output from the first butterfly. This notation simplifies the presentation of the timing diagrams (as illustrated in FIGS. 4–8). The absolute amount of delay that occurs between the processing stages will also be omitted from the timing diagrams for simplicity. It is noted that the time line for all of the timing diagrams runs from left to right. Thus, the leftmost data samples in each diagram are supplied to the pipeline first.

Figure 1:
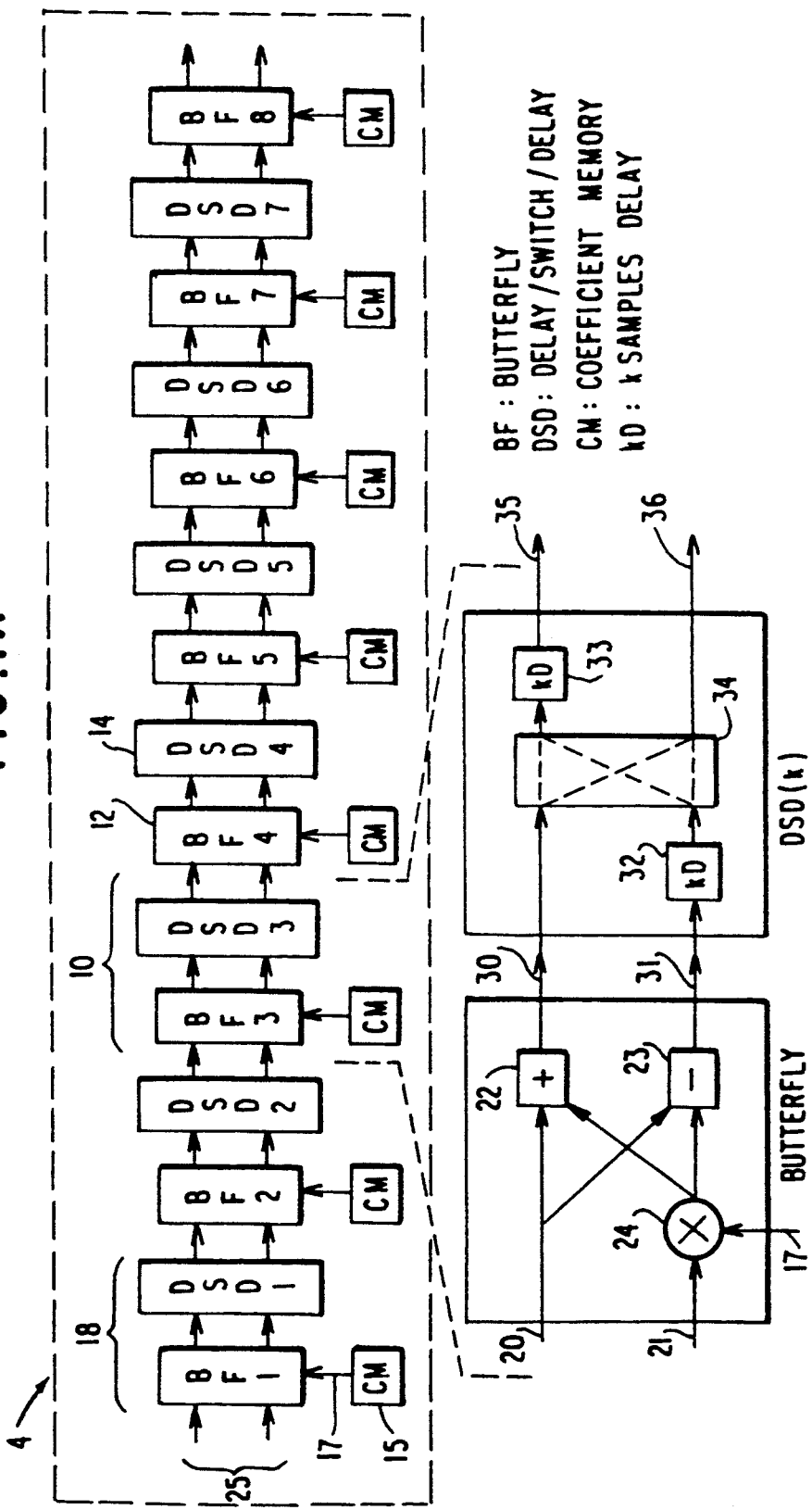
FIG. 1A illustrates an Eight-Stage Radix 2 Fast Fourier Transform Pipeline.
FIG. 1B illustrated in detail a delay element in a delay-switch-delay module of a stage of the pipeline.

A timing diagram that illustrates processing for an N-point FFT will consist of M blocks 50–55 (FIGS. 4a–4e) corresponding to the M stages of processing, with each block having two rows and N/2 columns for a total of N cells. Block 50 in FIG. 4a illustrates the order in which each data sample for a 32-point transform is input to the first stage 18 (FIG. 1A). Blocks 55–59 will be explained below with reference to FIG. 3. Each block contains N cells 60 which are numbered from 0 to N/2−1 for the first row, and from N/2 to N−1 for the second row. The sample indices 0, 1, 2, . . . , N−1 at a given stage m (M=0, 1, 2, . . . , M−1) are arranged in a predetermined initial order (FIG. 4a) based on the present inventions ordering method. These cells are rearranged (as illustrated in FIGS. 4b–4e) in each stage of processing based on the sequence of DSD operations (i.e. the amount of delay at each stage of the pipeline).

It will first be shown that it is always possible to perform a valid FFT, regardless of the order of the DSDs in the pipeline, provided that the input data (entered on lines 25 in FIG. 1A) and twiddle factors (entered on line 17) of the butterflies 12 are properly ordered.

At any given stage in the pipeline, the pairs of samples that must be combined in the butterfly modules are well known, as explained in *Theory and Applications of Digital Signal Processing*, by L. R. Rabiner and B. Gold, and *Applications of Digital Signal Processing*, "Applications of Digital Processing to Radar" by J. H. McClellan and R. J. Purdy, each of which are incorporated herein by reference. For instance, in the first butterfly module all sample pairs being combined must have indices that differ by N/2. It is not necessary however, to process the sample pairs at each stage in any specific order. Therefore, provided that the input ordering of the data and the sequence of DSD operations guarantee proper pairing of all samples at each stage, a valid FFT can be performed by rearranging the twiddle factors. Thus, the description that follows will primarily address timing and proper pairing considerations, since the method for determining values for twiddle factors for a given pipeline with known delays is well known.

An FFT of size N is performed in M stages, where in stage m (m=0, 1, . . . , M−1) each pair of samples entering a butterfly operation has indices i and j whose binary representations vary only in the $m^{th}$ position (m=0 for the leftmost position, and m=M−1 for the rightmost position).

The procedure for ordering the input data to an N-point FFT for any given sequence of DSD operations in a Radix 2 pipeline follows, an example of which is explained in detail below. Beginning with the first N-sample block (before the first butterfly), the first (leftmost) binary digit of each sample must be 0 for the top row and 1 for the bottom row. For the second block (after the first butterfly and commutator but before the second butterfly), the second binary digit of each sample must be 0 for the top row and 1 for the bottom row. This procedure continues until the last block, at which point the sample indices have been completely determined. The entries in all previous blocks may now be completed by working backward from the last to the first block. This approach guarantees that, in stage m, each pair of samples entering a butterfly module has indices i and j, whose binary representations vary in the $m^{th}$ position. It now remains to show that all the other M−1 positions of i and j are identical.

Figure 2:
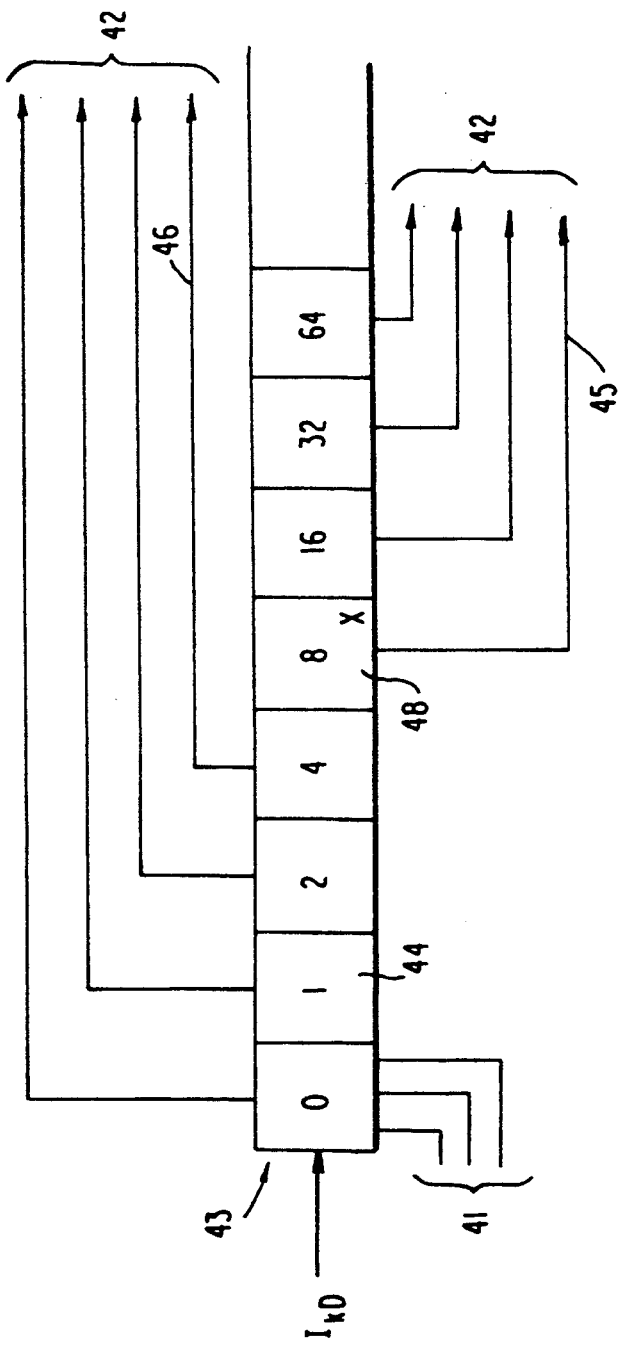
FIG. 2 illustrates the effective operation of a typical delay-switch-delay module upon the input data stream.

FIG. 2 shows that the effect of DSD (k) is to perform a 2×2 matrix transposition, where each element 70 of the matrix is a row of k cells (k equals 2 in this example). The DSD moves a sample in cell i to cell j, where i and j have the following binary representations:

$$i: i_0 i_1 i_2 \ldots i_{M-p-1} \ldots i_{M-1}$$

$$j: i_{M-p-1} i_1 i_2 \ldots i_0 \ldots i_{M-1}$$

and where $p = \log_2 k$.

Now consider two samples U and V that are in the same column in the first block. These two samples will therefore be in cells whose numbers are $$0\, i_1\, i_2\, i_3 \ldots i_{M-1}$$

and $$1\, i_1\, i_2\, i_3 \ldots i_{M-1}$$

According to the above, a sequence of DSD(k) operations will result in U and V being in two cells whose numbers have a binary representation with the same leftmost bit for any subsequent block (since a different value for k is used in each stage). However, this is equivalent to saying that the two cells are in the same row. This procedure therefore guarantees that the two samples U and V will have binary representations that differ only in the leftmost bit. Thus, two samples that are in the same column in the first block will be in the same row in all subsequent blocks. Repeating this argument for any two samples in the same column in any block m shows that it is indeed possible to perform a valid FFT for any sequence of DSD operations by properly arranging the input data. The following examples are based on the above theory of operation.

DETAILED DESCRIPTION OF THE PREFERRED EMBODIMENTS

Figure 10:
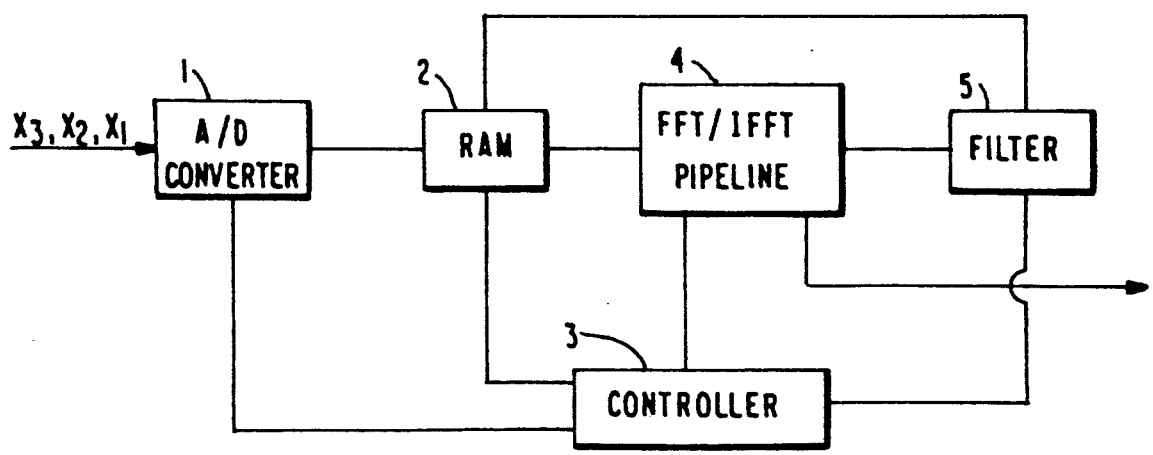
FIG. 10 represents one embodiment of the overall apparatus for performing the present invention.

FIG. 10 illustrates a system in which various size FFTs are used for digitally demultiplexing a number of frequency-multiplexed carriers that occupy bandwidths of various sizes, using a frequency-domain approach. Similarly, various size IFFTs are used to isolate the frequency spectrum associated with the desired bandwidth being processed.

An A/D convertor 1 (FIG. 10) converts the input signal to a digital sequence of data samples (x1, x2, x3, . . . xn), which are sequentially read into a RAM 2. The controller 3 determines the order in which samples are to be written from the RAM 2 (which is explained later) and thereafter controls RAM to write these samples to the FFT/IFFT module 4. The FFT/IFFT module 4 processes the data samples of the composite signal to perform fast Fourier transforms thereon. A filter 5 multiplies the transformed frequency coefficients across the overall spectrum by any desired filter functions to separate the various carriers and introduce spectral shaping, if desired. These samples are then stored back in RAM 2. Controller 3 thereafter writes out subsets of this input data stream back to the FFT/IFFT module, wherein each subset represents a specific frequency spectrum (or bandwidth) for an individual carrier. The samples contained within each subset are written to the FFT/IFFT module 4 in an unique order determined by the controller 3, which bases the ordering upon the size of the inverse transform to be performed and upon which stages within the IFFT pipeline are to be used.

FIG. 1A illustrates an exemplary pipeline architecture for the FFT/IFFT module 4 for a N-point transform having M stages, where M is the logarithm of the size of the transform to be performed (i.e. $M = \log_r N$, where the base r of the logarithm is the radix of the transform). Each stage 10 includes two modules: a butterfly module 12 for computing the arithmetic of the butterfly operations of the Cooley-Tukey FFT algorithm, and a delay-switch-delay (DSD) module 14 (otherwise known as a data commutator module) that reorders the data among the arithmetic modules in the pipeline.

Each butterfly module 12 (FIG. 1A) accepts inputs along lines 20 and 21 and transforms these to outputs 30 and 31 via adder 22, subtracter 23 and multiplier 24. The multiplier multiplies input 21 with a twiddle factor supplied from coefficient memory (CM) 16 along line 17. The twiddle factors used in the butterfly computations are represented by the equation:

$$W_N^{nk} = e^{-j(2\pi/N)} \qquad (1),$$

wherein each twiddle factor depends upon which stage in the pipeline it is being used at and on which sample it is operating (as determined by the sample indices) upon. The use of twiddle factors is discussed in more detail in *Theory and Applications of Digital Signal Processing*, by L. R. Rabiner and B. Gold, *Applications of Digital Signal Processing*, "Applications of Digital Processing to Radar" by J. H. McClellan and R. J. Purdy, and "A Pipeline FFT Processor for Word-Sequential Data," *IEEE Transactions on Acoustics, Speech, and Signal Processing*, by G. Bi and E. V. Jones, Vol. ASSP-37, No. 12, December 1989, pp. 1982-1985.

Each DSD module 14 (FIG. 1A) consists of shift registers (32 and 33) and a multiplexer 34 (switch) to provide the needed delay-switch-delay function. The switch has two states: (1) data input on lines 30 and 31 passes straight through the multiplexer 33 and is output on lines 35 and 36, respectively and (2) data on lines 30 and 31 is crisscrossed and output on lines 36 and 35, respectively. Lines 31 and 35 include shift registers 32 and 33 which provide a delay equal to k samples, in order that the multiplexer 34 performs a switching operation (i.e. crisscrosses the outputs of the lines 31 and 32) at k sample intervals. The switching interval for a given DSD is denoted by DSD(k). The controller 3 determines the value for each delay prior to operation.

For an N-point transform, the value of k is usually chosen as N/4 for the first DSD, N/8 for the second DSD, and so forth, with k=1 for the last DSD. Any permutation of the sequence N/4, N/8, . . . , 1 may be used as a valid DSD sequence, provided that the controller 3 outputs the data from RAM 2 to the pipeline input in the correct order and properly reorders the butterfly twiddle factors.

This flexibility in the delay sequence allows the pipeline to compensate for failures in the shift registers. The pipeline architecture of FIG. 1A is also desirable due to the simplicity with which the DSD modules perform the reshuffling operations. Indeed, several VLSI chips have been produced that perform this commutation operation, and these chips can easily be set by a control signal to provide one of several preset values for k.

FIG. 1B illustrates the detailed structure of shift registers 32 and 33. Controller 3 identifies, via control lines 41, which output line 42 from the register is to be used. Once the controller determines the size of the FFT to be performed by the pipeline, the controller fixes the number of stages in the pipeline to be used and sets the twiddle factors, switching times, and delays for each of these stages based upon known pipeline principles (as further explained in *Theory and Applications of Digital Signal Processing*).

The needed modifications are performed dynamically (using control signals 41) to allow the pipeline to alter the delay within each DSD and the twiddle factor within each butterfly before each FFT (IFFT) is performed in real time. This dynamic alteration enables the present pipeline to accommodate the various transformation sizes. By properly ordering the input data to the pipeline and "bypassing" some butterfly and DSD modules for the smaller size transforms, any mixture of sizes of FFTs (IFFTs) can be performed without requiring any changes to the simple and regular action of the DSD. A butterfly and DSD module is "bypassed" by setting the twiddle factor and the delay to "1", such that the inputs are passed through the stage without modification.

These transforms may be accomplished regardless of the sequence of the commutators in the pipeline. This enhances the fault tolerance of the pipeline, since various DSDs within the pipeline need different amounts of delay. A single chip design with a delay line providing the longest delay needed is typically used, with smaller delays obtained by simply selecting among a set of taps 42 (FIG. 1B) on the shift register 43. When one of the memory cells 44 in the register 43 is damaged (for instance cell 48 indicated by the "X"), the register can still provide a valid delay for the DSD function by selecting one of the taps preceding the damaged cell. Thus, register 43 can still provide a delay of up to "4" samples even though the register is damages. Although the cells after tap 46 cannot be used, the stage of the pipeline containing this register is not completely lost and can be used as a stage requiring delays of 4 samples or less.

Thus, by reordering the input data and reconfiguring the DSD function of the other stages, correct FFT operation may still be accomplished. All the required changes can be performed under software control, without physically removing or interchanging any components. Other approaches to enhancing fault tolerance of an FFT pipeline that include the incorporation of one or more spare modules, thus resulting in even greater reliability.

Prior to performing a FFT or IFFT, controller 3 tests each stage to determine whether any shift registers contain faulty memory cells. Thereafter, the controller assigns a delay and corresponding twiddle factor to each stage based upon its delay capacity. There are a variety of methods for determining the delay for each stage, which will not be discussed in detail. In the preferred embodiment, for an N-point transform the controller assigns a delay of N/4 to the first DSD stage, N/8 to the second DSD, and so forth, with a delay of 1 for the last DSD stage. If however, any stage contains a faulty register and is unable to perform the preferred delay, the controller simply interchanges the delay intended for the faulty register and a shorter delay from a non-faulty register. This method of assignment is merely one of many examples and is not intended to limit the present invention's method of delay assignment in any way.

Figure 9:
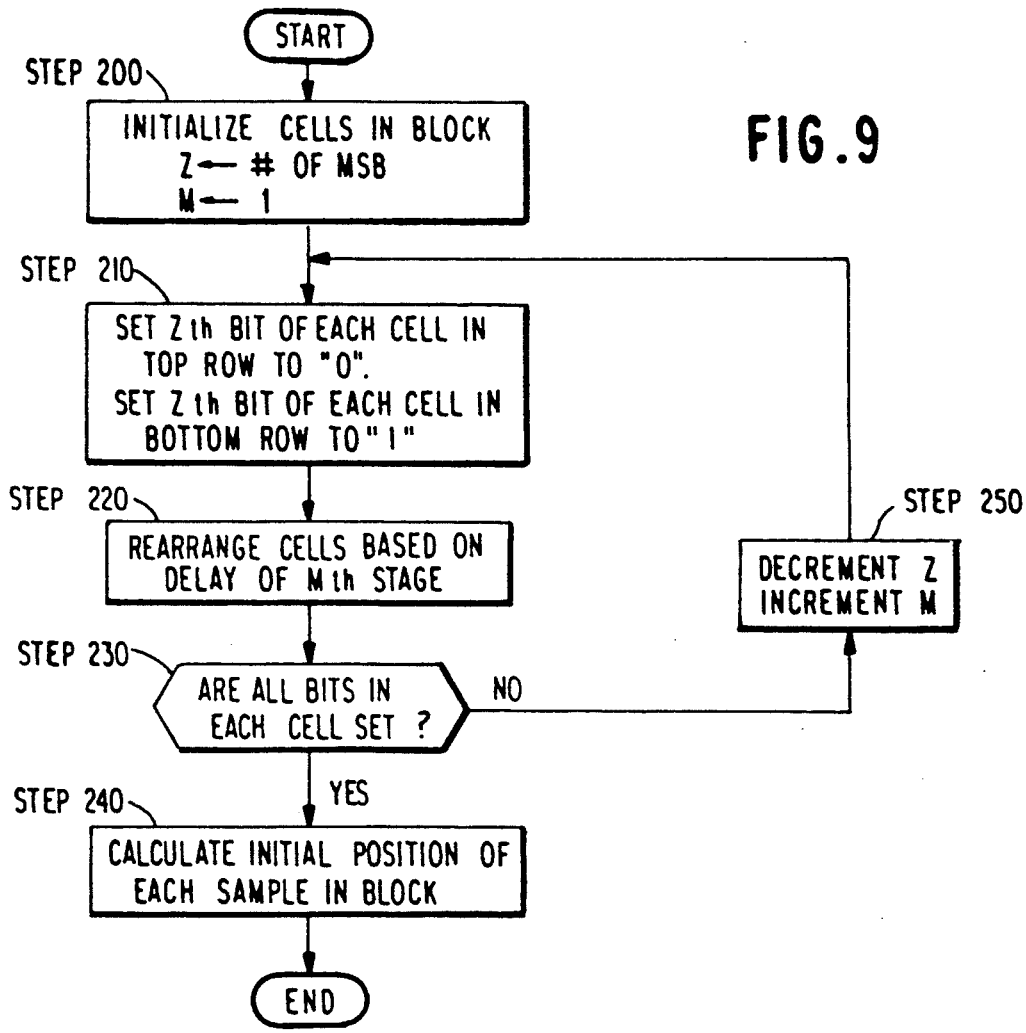
FIG. 9 illustrates a flowchart representing the method for determining the order in which data samples are written to the pipeline.

Once the controller assigns the delays for each stage, the controller calculates the new order in which the samples must be delivered to the first stage of the pipeline. The flowchart of FIG. 9 illustrates the method by which controller 3 reorders the input samples. The following example represents a 32-point transform performed by a 5 stage pipeline, wherein the delays at each stage have been set at 2 samples for the first stage, 1 sample for the second, 8 for the third, 4 for the fourth and 16 for the fifth.

First the controller generates and initializes a block 100 (FIG. 11a), which includes two rows of N/2 cells (N being the size of the transform). These cells have been labeled "A" through "FF" to facilitate the explanation of the present method. The block corresponds to a segment of sequential input data ($x1, x2, x3, ...$) received by the A/D convertor 1. The segment size equals the size of a largest desired transform (which may or may not equal the largest transform the pipeline is capable of processing). Thus, for a 32-point transform, block 100 represents a segment of input data containing 32 samples. Each cell 66 contains a word 65 of information (initialized to zero), which identifies the position of a data sample within each segment. Each word 65 contains enough bits to uniquely distinguish each position in the segment (i.e. 5 bits for a segment having 32 samples). Once the value for each word is determined, these values identify the order in which data samples from each segment are written from RAM 2 to the pipeline in the FFT/IFFT module 4. Data samples are written to the pipeline in pairs in the Radix 2 pipeline of the first embodiment and thus the leftmost cell pair in block 100 identifies the first two data samples to be written from RAM 2.

The controller also initializes a bit pointer Z to point to the most significant bit (MSB) in each word 65, and a stage pointer M to point to the first stage (step 200).

Once the cells 66 and pointers are initialized, the controller assigns a "0" to the "Zth" bit 67 (designated by the bit counter Z) in each word (FIG. 11b) in the top row of the block and a "1" to the "Zth" bit 68 (designated by the bit counter Z) in each word in the bottom row. The controller sets the MSB of each word first (step 210), since the bit pointer Z is initialized to point to the most significant bit. Setting the MSB of each row first ensures that all sample pairs being combined/processed in the first stage of the pipeline will be separated in the input data stream by N/2 samples. Thus, for a 32-point transform the first sample (having an index of "0") must be combined/processed with the 17th sample (having an index of "16").

Next, the controller calculates the new position that each cell will occupy after the first stage processes the block (step 220). The new positions are determined by the delay of the first stage. Thus, if the first stage has a 2 sample delay, the cells will be repositioned as shown in FIG. 11c, in which cells C and D exchange positions with cells Q and R, while cells A, B, S and T remain in their original positions. The remaining cells in the block are interchanged in a similar manner.

Thereafter the controller sets the second most significant bit 69 (FIG. 11c) of each cell in the top row to "0" and the second MSB 71 of each cell in the bottom row to "1". This second setting operation is due to the fact and is intended to ensure that the second stage of a pipeline combines/processes data sample pairs which are separated by N/4 samples. Thus, the first data sample (having an index of "0") must be combined with the fifth sample (having an index of "4"), while the second sample (index of "1") is combined with the sixth sample (index of "5").

Next, the controller calculates the new position (as illustrated in FIG. 11d) each cell will occupy after the block is processed by the second stage which has a 1 sample delay. Here cells B and C are interchanged, while cells D and Q remain unmoved. Similarly, cells R and S are interchanged, and cells T and E are unchanged. The remaining cells are interchanged in this same pattern.

Thereafter, the third most significant bit of each cell are set to "0" and "1" in the top and bottom rows respectively. This process is repeated to obtain the cell arrangement in FIG. 11e after the block is processed by the third stage which has a 8 sample delay, and in FIG. 11f after a stage having a 4 sample delay. Once the cell arrangement in FIG. 11f has been calculated and the last bit has been set for each cell, the controller is able to uniquely identified the position of each data sample within the block after the fourth stage of the pipeline.

It is noted that the position of each cell after the fifth block is not calculated, since each cell in the block after the fourth stage uniquely identifies (in binary notation) a data sample in the corresponding segment. For instance, cell S (FIG. 11f) indicates that the 24th data sample of each segment of 32 samples will lie in the fourth position of the top row of the pipeline after the fourth stage of processing. Similarly, cell EE indicates that sample 29 will lie in the eighth position of the bottom row of the pipeline after the fourth stage of processing.

The controller uses this information to determine the starting order, in which each data sample must be read from RAM 2 to the FFT/IFFT module 4 to ensure that the correct data samples are paired in each stage of processing. More specifically, the controller maintains a table identifying each cell and its corresponding initial position. Once the controller identifying which sample corresponds to each cell the controller uses this sample/cell correspondence and the table of cells and initial positions to identify the initial position of each sample. For instance, cells A and Q, which correspond to data samples 0 and 16 respectively (as indicated by the 5 bit notations in these cells in FIG. 11f), were originally positioned as the first cell pair in the block (FIG. 11a). Thus, the controller will write samples 0 and 16 from RAM as the first data pair to the pipeline. Similarly, samples 4 and 18 will be written as the second data pair, since cells B and R (FIG. 11a) are the second cell pair and cells B and R correspond to samples 4 and 18 (FIG. 11f).

The above reordering method is not limited to Radix 2 FFTs (i.e. a pipeline having 2 input lines), since every type of pipeline has a known manner for rearranging input data samples at each stage. Also, every type of pipeline has predetermined data groups which must be combined in each stage of the pipeline. For instance, in a four-stage Radix 4 FFT pipeline (FIG. 5), data quads (i.e. sets of 4 data samples) combined in the first stage must be separated by N/4 samples. Data quads in the second stage must be separated by N/16, etc. and data quads in the last stage must be separated by 1. The manner in which cells are rearranged in different stages based upon the stage's delay is explained in detail in *Theory and Applications of Digital Signal Processing*, by L. R. Rabiner and B. Gold, and *VLSI Signal Processing Systems*, by E. Swartzlander Jr.

For a Radix 4 pipeline, the above process in FIG. 9 is repeated by using a block containing 4 rows of cells for calculating the order in which samples are written from RAM 2. However, step 210 is varied accordingly (from merely setting the "Zth" bit of the top row to "0" and bottom row to "1") to ensure that the correct sample quads are combined. More specifically, two bits are set during each iteration through step 210. Thus, the MSB and second MSB are set during the first interation through step 210 (i.e. "00" in the top row, "01" in the second row, "10" in the third row, and "11" in the fourth row). This ensures that the samples in each data quad combined in the first stage are separated by N/4 samples. Similarly during the next iteration through step 210, the third and fourth MSBs are set for each row, to ensure that the samples combined in the second stage are separated by N/16 samples.

Another basic advantage of the present pipeline structure and data ordering method is that a single pipeline can perform several smaller transforms having different sizes without having to change the stage delays or repeat the above data ordering calculations. For example, to perform various transforms have sizes $N_i$ ($i=1, 2, 3, \ldots$) with $N > N_1 > N_2 > N_3 > \ldots$ the largest transform size (N) determines the minimum number of stages M in the pipeline (i.e. $M = \log_2 N$). The transform of size N is handled as in the single transform case discussed above.

These smaller desired transforms are first combined into groups, with each group having a total size equaling N. The number of such groups is determined by the aggregate sum of all transform sizes. The controller 3 creates a map to establish a one-to-one relation between the sample indices of each smaller transform and the sample indices of the N-point transform (as illustrated in FIG. 3). First, the binary representation of each integer from 0 to N−1 is listed. Thus, the binary representations of 0 to 32 are listed (along the left side of the map). These binary digits (bits) are denoted by $i_0 \, i_1 \, i_2 \, i_3$ and $i_4$ When mapping smaller transforms into the largest transform, the controller fixes $M-M_2$ bits from the $i_0$ to $i_4$ bits corresponding to the largest transform, wherein M represents the number of bits needed to designate the largest transform (M also represents the number of stages in the pipeline) and $M_2$ represents the number of bits needed to designate the smaller transform. Thus, when the controller is mapping a 16-point transform (as indicated in column 70 of FIG. 3) into a 32-point transform, the controller fixes one bit (such as $i_4$) at "1" or "0". The decimal equivalent is shown for columns 70-75 of FIG. 3 instead of the binary representation for convenience.

Thereafter, the controller maps an 8-point transform (column 71) into the 32-point transform, by fixing 2 bits ($i_4 = 0$ and $i_1 = 1$). One 4-point and two 2-point transforms are also mapped into the 32-point transform. It is noted that as each additional smaller transform is added to the map, the fixed bit(s) from the preceding smaller mapped transform(s) remain fixed (but at the opposite value) in each additional transform. In other words, when the controller fixes $i_4 = 1$ for the 16-point transform, the controller fixes $i_4 = 0$ for the remaining smaller transforms. This ensures that a one-to-one mapping relationship is retained between each data sample from the smaller transforms and each data sample from the largest transform. Once this map is created, smaller transforms can be processed by simply writing the data samples for the smaller transforms from RAM 2 to the FFT/IFFT module 4 in the necessary order based on the map (in FIG. 3) and the order calculated for the largest transform. In the instant example, a group consisting of one 16-point transform, one 8-point transform, one 4-point transform and two 2-point transforms is mapped into the largest transform.

When the system performs the above group of smaller transforms, it maps the data samples from each smaller transform into the largest transform's data sample positions. Samples 0–15 (for the 16-point transform) are written to the pipeline in the order illustrated in FIG. 12b based on the mapping relation in FIG. 3. FIGS. 12b–12e set forth the sample positions for the 8-point, 4-point and 2-point transforms, respectively. During actual processing, these data samples are combined into a single block having 32 cells (see block 55 in FIG. 4a) with the samples from each transform remaining in the positions indicated in FIGS. 12b–12e. Block 55 (FIG. 4a) indicates which transform each sample corresponds to by using various hashing and shading schemes.

Before processing these multiple transforms, the controller ensure that data samples from different transforms are not combined/processed. The controller prevents this by mapping each smaller transform sample into the corresponding cells in blocks 55–59 (FIG. 4a–4e), which correspond to the pipeline stages. The controller tests the cell arrangement within each block 55–59 along the pipeline, to determine whether each cell pair (i.e. upper and lower cells of each column that will enter the next butterfly/commutator at the same time) contains data samples corresponding to the same or different transforms.

When the controller identifies a cell pair that contains samples from different transforms, the controller sets a flag by that cell pair (as illustrated with "X"s in FIGS. 4a–4e). These flags ensure that cell pairs having data samples from different transforms are bypassed in the appropriate stage of the pipeline. Thus during operation, the first, third, ninth and eleventh cell pairs in block 57 (FIG. 4c) will not be combined/processed in the third stage of the pipeline, since these cell pairs contain samples from different transforms (as indicated by the hashed and shaded regions).

This mapping procedure can be generalized for any set $S_i$ of samples of a given transform (shade) in the right half of the FIGS. 4 and 6-8, each index represents a number formed by dropping a fixed set of binary digits from the corresponding index in the left half of the figure. Therefore, the property inherent in the N-point transform in the left half, namely that in block m, the numbers in each column pair vary only in the $m^{th}$ bit, will carry over to the right half of the figure in the following way. If the $M^{th}$ position were dropped while mapping the set $S_i$, then each column in block m that contains an element of $S_i$ will always contain an element from a different set, and the butterfly operations should be bypassed. If, on the other hand, the $m^{th}$ position were not dropped while mapping the set $S_i$, then each column in block m containing an element of $S_i$ will also contain another element from $S_i$ that differs from the first only in the $m^{th}$ bit (of the original M-bit notation). If $S_i$ contains $N_i = 2^{M_i}$ elements, this will occur precisely $M_i$ times, and the transform of set $S_i$ will be complete.

An alternative embodiment uses radix 4 pipelines to perform a number of different-size FFTs simultaneously. As in the previous embodiment the most general framework will be considered in order to allow for reconfigurations that would enhance system reliability.

The radix 4 FFT is often preferred to the radix 2 because it is 25 percent more efficient in terms of the number of multiplications. However, the size of the transform to be performed must be a power of 4 (i.e., an even power of 2), which makes it more restrictive than the radix 2 transform. Pipelines of mixed radix (4 and 2) will be considered below. Most of the points discussed above also apply here, with straightforward modifications.

Figure 5:
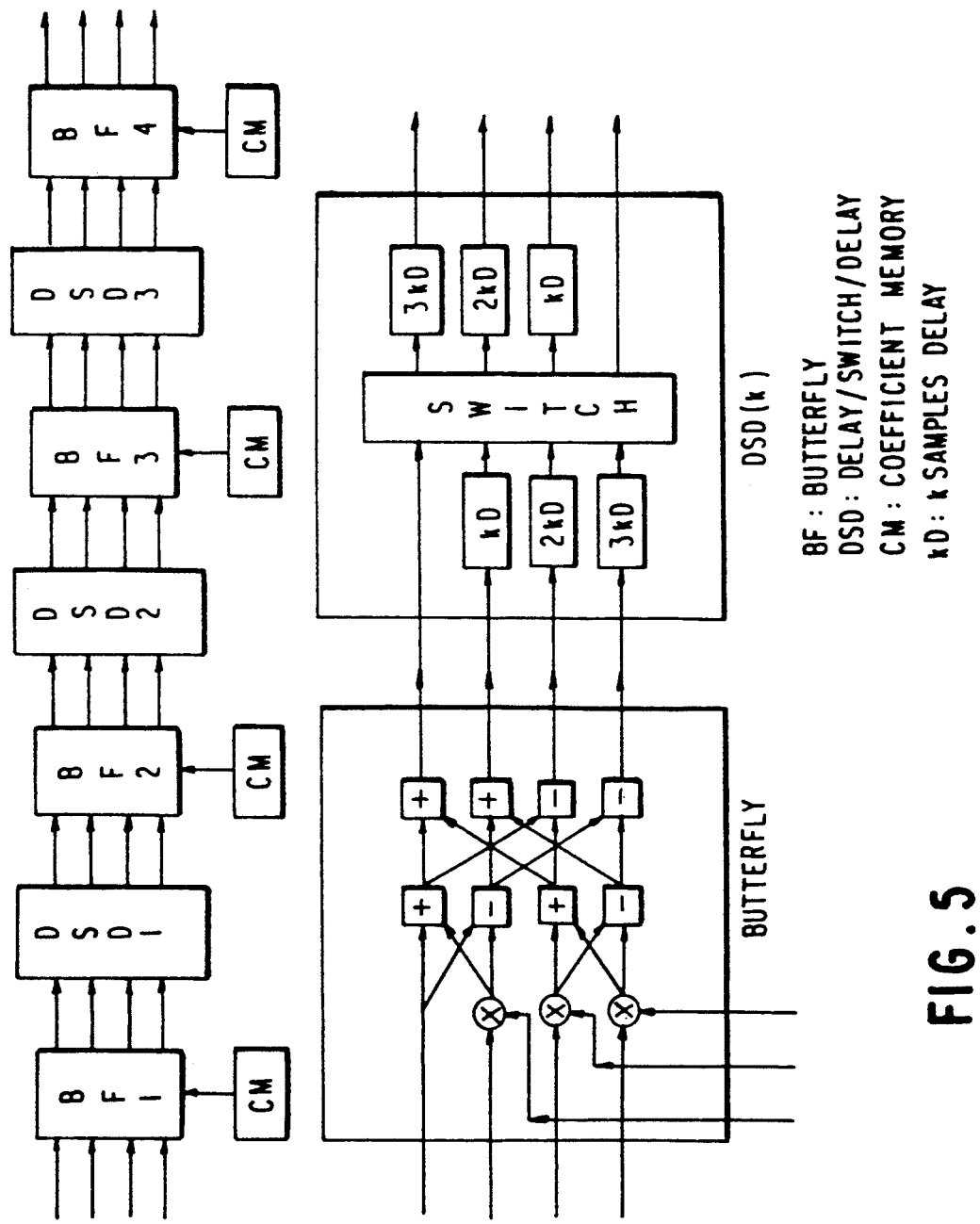
FIG. 5 represents a Four-Stage Radix 4 Fast Fourier Transform Pipeline.

FIG. 5 illustrates a radix 4 FFT pipeline. The number of stages (M) is equal to $\log_4 N$. A radix 4 FFT is performed by first combining a quad of samples whose indices are N/4 apart. In the second stage, quads of samples whose indices are N/16 apart are used, and so on until the last stage where quads of samples whose indices are 1 apart are combined. In other words, in stage m (m=0, ..., M−1), quads of samples whose indices i, j, k, and l have a quaternary representation varying only in the $m^{th}$ position (base 4) are combined.

Timing diagrams similar to those of the previous embodiment are used, in which each block represents the sample indices at each stage of the pipeline. Here, the blocks will consist of four rows and N/4 columns, and the cells of these blocks will be numbered row-by-row from 0 to N−1.

The action of the DSD for radix 4 transforms can be found in *Theory and Applications of Digital Signal Processing*, by L. R. Rabiner and B. Gold, and *VLSI Signal Processing Systems*, by E. Swartzlander Jr. It is easy to show (in a manner that parallels the radix 2 case) that the effect of DSD(K) is to perform a 4×4 matrix transposition where each element of the matrix is a row of k cells.

Using the same mapping method presented above, any combination of sizes of power-of-4 FFTs can be performed given any sequence of DSDS. FIG. 6a illustrates such an example where block 80 represents a 64-point transform and block 81 represents three 16-point, and four 4-point transforms. The cells for which the butterfly operations must be bypassed are marked by an "X" in the same manner as described above. The sequence of DSDs is a 1 sample delay and a 4 sample delay.

FIGS. 7a–7c and 8a–8c set forth the timing diagrams for two mixed size mixed Radix pipelines, which allows the efficiency of a Radix 4 pipeline while allowing odd powers of 2 transforms.

In the first case, a radix 2 stage is added at the end of the pipeline. This last stage consists of two DSDs and two butterfly modules operating in parallel and independently of each other. In the second case, the radix 4 butterfly at each stage is dynamically reconfigured, as needed, to function as two radix 2 butterflies operating in parallel at the command of a control signal. Specific structures for these two cases are illustrated in "Applications of Digital Processing to Radar" by J. H. McClellan and R. J. Purdy, wherein two radix 2 butterflies operating in parallel constitute the major building blocks of a radix 4 butterfly.

In the first case, all transforms that are odd powers of 2 undergo the last stage of processing in the last stage of the pipeline, which consists of two radix 2 butterflies and DSDs operating in parallel. The number of radix 4 stages in the pipeline is determined by the largest transform desired. The number of radix 4 stages is denoted by M1. Therefore, the largest transform that may be performed in this pipeline is $N=2N_1$ where $N_1=4^{M_i}$. Such a transform of size N will be viewed as consisting of two separate transforms of size $N_1$ each, which must be performed before they are combined in the last stage. The first $N_1$-point transform is referred to as belonging to the "even" class and the second as belonging to the "odd" class. Since the samples of each $N_1$-point transform must be processed at all radix 4 stages, the samples of the two sets should never be mixed before the last stage (i.e., they should never appear in the same column of cells). Therefore the block of N cells is seen as consisting of two separate sub-blocks, each of size N1, with the samples of the even class belonging to one sub-block and those of the odd class belonging to the other. These two sub-blocks can be interleaved at any desired depth, w, where w is the delay provided by the radix 2 DSDS. A transform of size $N_1$ (belonging to another group of samples) must have all of its samples belonging to the even class or all of its samples belonging to the odd class, since all $N_1$-point transforms are processed identically by the DSDS. Similarly, a transform of size $N_1/4$ must belong completely to either class, since the location of its samples must be a subset of the locations of an $N_1$-point transform. This leads to a somewhat restrictive situation, since the collection of transforms that are even powers of 2 must divide into two classes of sets of equal size, with each set belonging entirely to one class. This may lead to operation of the pipeline at slightly less than 100-percent utilization, or to some increase in the buffering requirements.

Figure 7A:
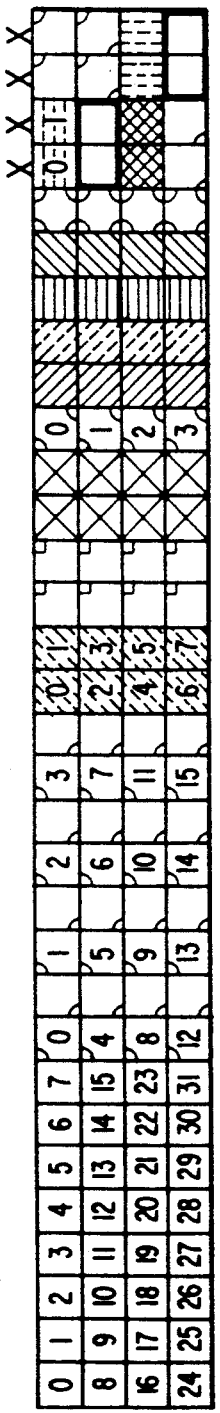
FIGS. 7a–7c represent a timing diagram for the first embodiment of a Mixed-Size Mixed Radix Fast Fourier Transform.
Figure 7B:
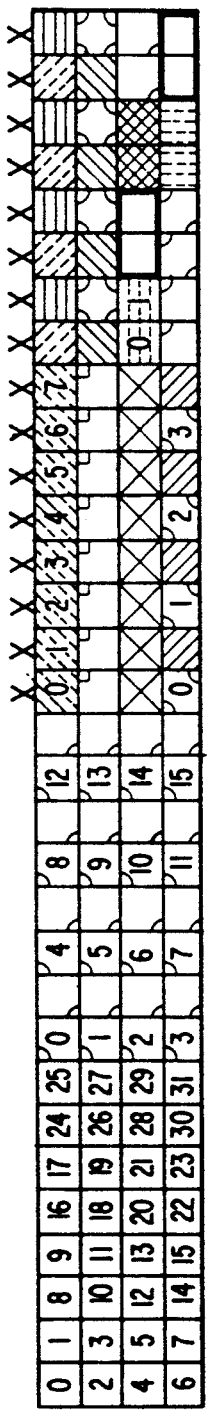
Figure 7C:
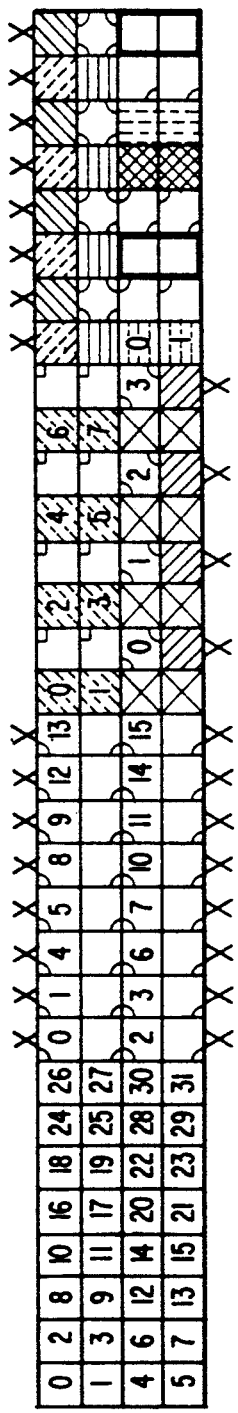

FIGS. 7a-7c illustrate an example where the required transform sizes are 32, 16, 16, 8, 8, 8, 4, 4, 4, 4, 4, 4, 2, 2, 2, 2, 2, 2, 2, 2. In this case, the above condition is satisfied, since 16, 16, 4, 4, 4, 4, 4, 4 can be divided in two classes of sets of equal size, with each transform belonging completely to one class. Note that this would also be true if a 16-point transform were replaced by four 4-point transforms. However, it would not be true if a 4-point transform were replaced by two 2-point transforms. Note also that, in this example, the depth of interleaving w equals 1 (i.e., the radix 2 DSD has k=1). The radix 4 DSD has k=2 (not 1), due to the interleaving. The cells for which the butterfly operations must be bypassed are marked by an X. Since the last stage consists of two radix 2 butterflies operating in parallel, the last block of FIGS. 7a-7c use an upper row of Xs to denote bypassing of the upper butterfly and a lower row of Xs to denote bypassing of the lower butterfly.

In the second case, the radix 4 butterflies at each stage are designed to be reconfigurable to two radix 2 butterflies at the command of a control signal, then any mixture of power-of-2 transform sizes may be performed, as illustrated in FIG. 8.

Figure 8A:
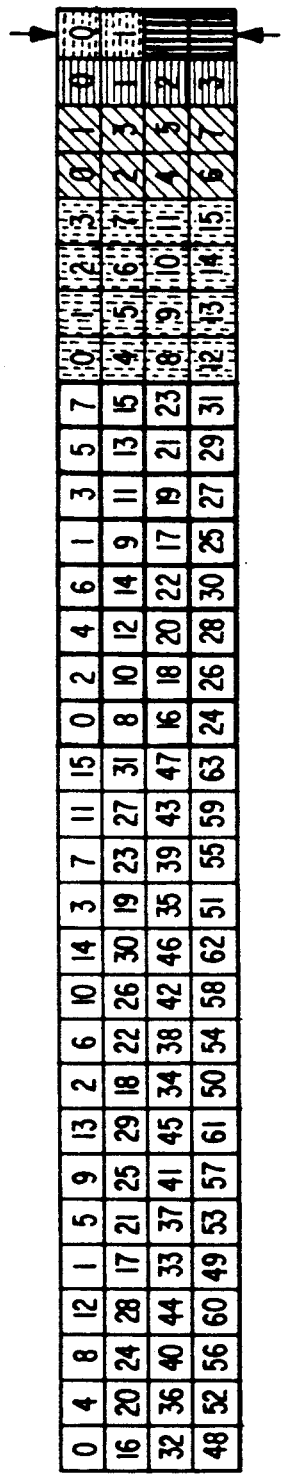
FIGS. 8a–8c represent a timing diagram for the second embodiment of a Mixed-Size Mixed Radix Fast Fourier Transform.
Figure 8B:
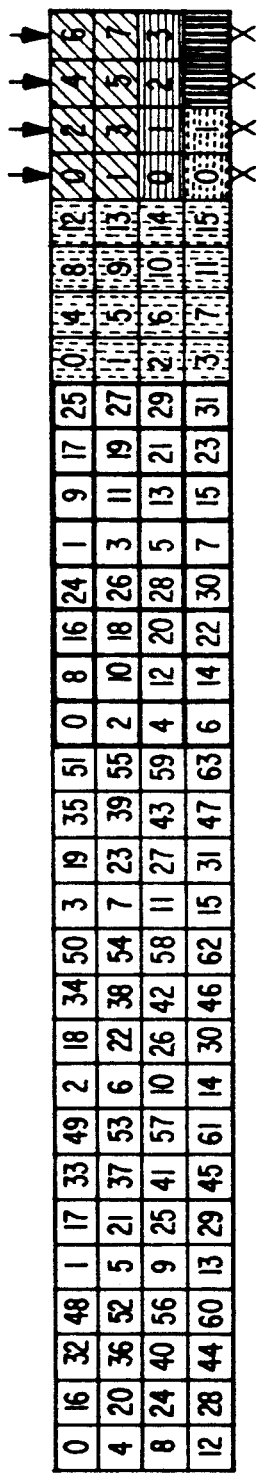
Figure 8C:
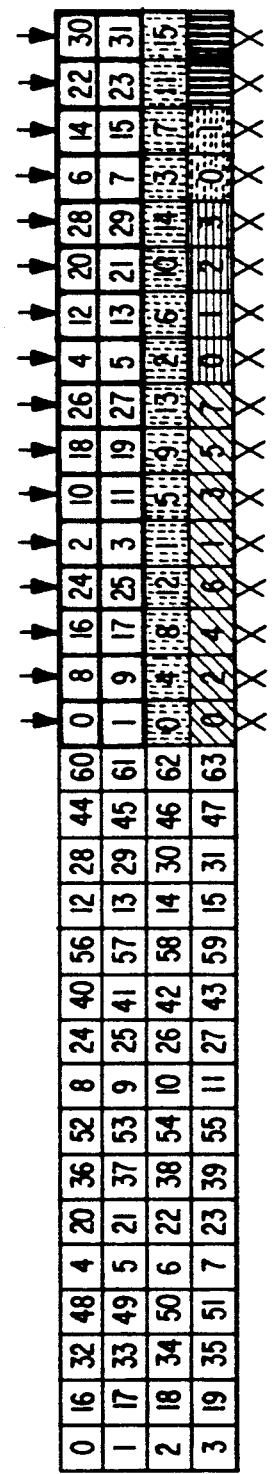

To verify that this arrangement can handle any such mixture of transform sizes for any DSD sequence, refer to FIGS. 8a-8c and note first that the pipeline has three stages, thus the largest transform that can be handled has 64 points. For any DSD sequence, a 64-point transform can be performed as discussed previously, since this is a pure radix 4 transform. To order the input data for a 32-point transform, a 64-point block (as shown in the left half of FIGS. 8a-8c, clear cells) is divided into four sub-blocks as follows: sub-block 0 consisting of samples 0, 4, 8, . . . 60; sub-block 1 of samples 1, 5, 9, . . . , 61; sub-block 2 of samples 2, 6, 10, . . . , 62; and sub-block 3 of samples 3, 7, 11, . . . , 63. For a 32-point transform, sub-blocks 0 and 1 are used as shown (sub-blocks 2 and 3 could have been used instead). For a 16-point transform, sub-block 2 may be used. This leaves sub-block 3, which consists of 16 points. To perform an 8-point transform, sub-block 3 is further divided into four sub-sub-blocks and the above procedure is repeated on a smaller scale. FIGS. 8a-8c illustrate an example where the required transform sizes are 64, 32, 16, 8, 4, 2, 2. An arrow in this figure indicates performing a radix 2 butterfly, while an X indicates bypassing a radix 2 butterfly.

The forgoing examples are only intended to better illustrate the present invention and are not intended to limit the scope of the invention to any particular environment.

What is claimed is:

1. A method for performing on an input signal fast Fourier transforms or inverse fast Fourier transforms of multiple sizes simultaneously in a single pipeline with multiple stages, said method comprising the steps of:
   providing a Fourier transform processor comprising a plurality of stages, each of said stages comprising a butterfly computational element and a switch-delay-switch element;
   storing an input data stream in memory as data samples;
   calculating a new order in which data samples from said stored input data are to be combined for processing by the pipeline in accordance with a number of said stages actively operating on said data samples and in accordance with a configuration of said switch-delay-switch elements;
   writing said data samples to a first stage of the pipeline in said new order; and
   processing said data samples through said multiple stages of said pipeline, while bypassing selected ones of said stages when a number of said data samples stored in said memory is less than an predetermined maximum number.

2. The method of claim 1 wherein said new order differs from an order in which said input data stream was written to memory, said difference being determined by a delay in each stage of the pipeline.

3. The method of claim 1 wherein said calculating step further comprises the steps of:
   initializing a block of data cells to be processed by the pipeline, said cells being arranged in rows, wherein each of said cells corresponds to a data sample from said input data stream and the number of cells in said block corresponds to a predetermined transform size;
   setting at least one bit from a plurality of bits in each cell based upon a position of the cell in the block and upon a position of a next stage in the pipeline to process the block; and
   rearranging the cells within said block based on a delay in said next stage, in order to generate a next block of cells corresponding to an output of said next stage.

4. The method of claim 3, wherein said order step further comprises the steps of:
   repeating said setting and rearranging steps until all of said plurality of bits are set, such that said plurality of bits in each cell uniquely identify one data sample from said input data stream; and
   calculating initial positions of each of said cells in said initialized block prior to processing by any of said stages, such that said initial positions of the cells identify said new order of data samples.

5. The method of claim 3, wherein said transforms of multiple sizes includes a largest transform and a plurality of smaller transforms, said method further comprising the steps of:

after said rearranging step, generating a mapping table having a one-to-one mapping relation between each data sample in said largest transform and each data sample in said plurality of smaller transforms; and reordering said data samples corresponding to said plurality of smaller transforms based on said mapping table and the positions of said data samples in said new order corresponding to the largest transform.

6. The method of claim 5, further comprising the steps of:

determining whether data sample groups to be combined at each stage of the pipeline correspond to different ones of said plurality of smaller transforms; and preventing data samples, corresponding to different smaller transforms, in a data sample group from being combined.

7. The method of claim 1, wherein said transforms of multiple sizes includes a largest transform and a plurality of smaller transforms, said method further comprising the steps of:

prior to writing said input data to the pipeline, generating a mapping table to create a one-to-one mapping relation between each data sample in said largest transform and each data sample in said plurality of smaller transforms; and reordering said data samples corresponding to said plurality of smaller transforms based on said mapping table and the positions in said new order of data samples corresponding to the largest transform.

8. The method of claim 7, further comprising the steps of:

determining whether data sample groups, which correspond to data samples to be combined, from said plurality of smaller transforms correspond to different ones of said plurality of smaller transforms; and preventing data sample groups from different smaller transforms from being combined.

9. An apparatus for performing on an input signal mixed size fast Fourier transforms (FFT) or inverse fast Fourier transforms (IFFT) simultaneously in a single pipeline structure having multiple stages, said apparatus comprising:

a memory for storing an input data stream in a first order as data samples;

a multiple-stage FFT/IFFT pipeline processor for performing fast Fourier transforms and inverse fast Fourier transforms, each stage of said pipeline processor comprising a butterfly computational element for performing predetermined mathematical operations on data samples applied thereto, and a delay-switch-delay circuit for selectively delaying and ordering data samples operated upon by said butterfly computational element, a first stage of said pipeline processor receiving reordered data samples from said memory;

a controller for calculating a new order in which the data samples are written from memory to the pipeline for controlling said delay-switch-delay elements to select a delay time and data sample order set thereby, and for bypassing selected ones of said stages when a size of said data stream is less than a predetermined value, said new order being determined in accordance with a number of stages actively operating upon said data samples and with delay times and data sample orders set by said delay-switch-delay elements, wherein a single said apparatus can perform Fourier transforms on data streams of different sizes.

10. The apparatus of claim 9, wherein said controller further comprises:

means for initializing a block of data cells to be processed by the pipeline, said cells being arranged in rows, wherein each of said cells corresponds to a data sample from said input data stream and the number of cells in said block corresponds to a predetermined transform size;

means for setting at least one bit from a plurality of bits in each cell based upon a position of the cell in the block and upon a position of a next stage in the pipeline to process the block; and means for rearranging the cells within said block based on a delay in said next stage, in order to generate a next block of cells corresponding to an output of said next stage;

wherein said setting means and rearranging means continually process the block of cells until all of said plurality of bits are set, such that said plurality of bits in each cell uniquely identify one data sample from said input data stream.

11. The apparatus of 10, wherein said controller further comprising:

means for calculating initial positions of each of said cells in said initialized block prior to processing by any of said stages, such that said initial positions of the cells identify said new order of data samples.

12. The apparatus of claim 10, wherein said transforms of multiple sizes include a largest transform and a plurality of smaller transforms, and said controller further comprising:

means for generating a mapping table having a one-to-one mapping relation between each data sample in said largest transform and each data sample in said plurality of smaller transforms; and means for reordering said data samples corresponding to said plurality of smaller transforms based on said mapping table and the positions of said data samples in said new order corresponding to the largest transform.

13. The apparatus of claim 12, further comprising:

means for determining whether data sample groups to be combined at each stage of the pipeline correspond to different ones of said plurality of smaller transforms; and means for preventing data samples, corresponding to different smaller transforms, in a data sample group from being combined.

14. The apparatus of claim 9, wherein said transforms of multiple sizes include a largest transform and a plurality of smaller transforms, and said controller further comprises:

means for generating a mapping table to create a one-to-one mapping relation between each data sample in said largest transform and each data sample in said plurality of smaller transforms; and means for reordering said data samples corresponding to said plurality of smaller transforms based on said mapping table and the positions in said new order of data samples corresponding to the largest transform.

15. The apparatus of claim 14, further comprising:
means for determining whether data sample groups, which correspond to data samples to be combined, from said plurality of smaller transforms correspond to different ones of said plurality of smaller transforms; and means for preventing data sample groups from different smaller transforms from being combined.

* * * * *